June 19, 1962 — F. KALATA — 3,039,434
HOG FEEDER
Filed July 1, 1960
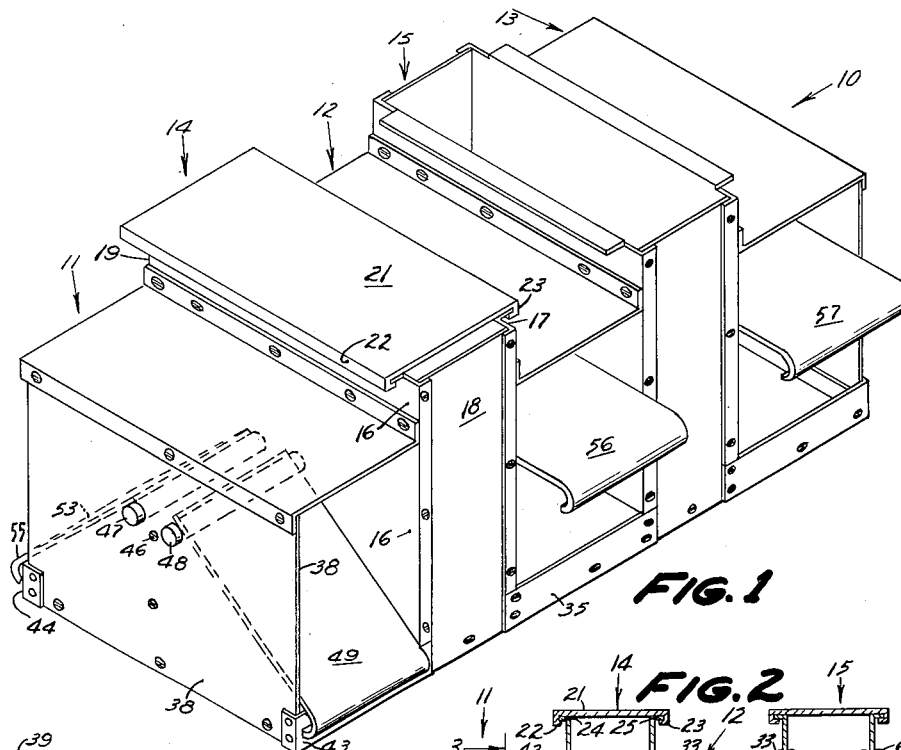
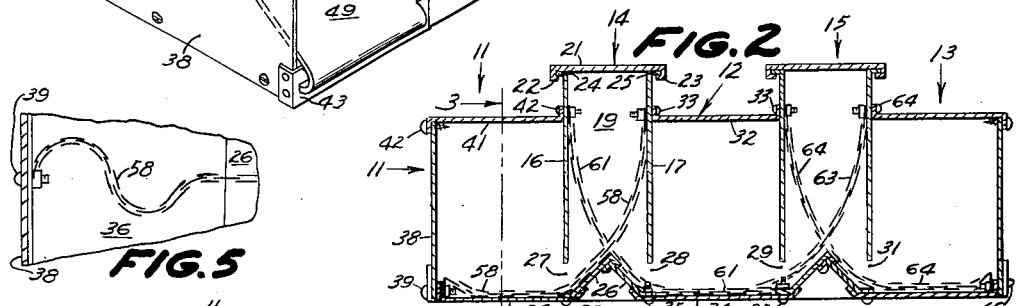
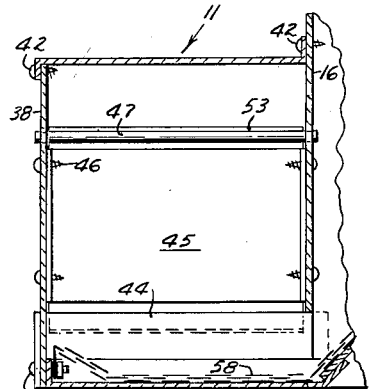
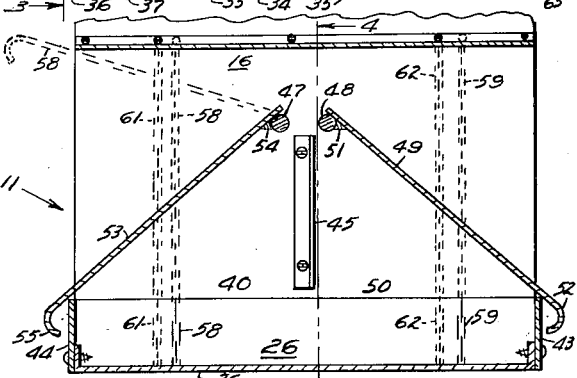
INVENTOR.
FRANK KALATA
BY Stanley E. Binish
ATTORNEY

United States Patent Office 3,039,434
Patented June 19, 1962

3,039,434
HOG FEEDER
Frank Kalata, Omro, Wis., assignor of one-quarter to Stanley E. Binish, Green Bay, Wis.
Filed July 1, 1960, Ser. No. 40,445
3 Claims. (Cl. 119—52)

This invention relates generally to an animal feeder, and more particularly to a feeder for hogs.

The purpose of this invention is to provide a feeder for hogs that eliminates the clogging or caking of feed therein, that reduces the feed waste to a minimum, and that eliminates the sidewise pushing and resulting intimidation of one another when feeding.

An object of this invention is the provision of a hog feeder that is non-clogging, and which is hog controlled to insure a steady flow of feed therein.

Another object is to provide a hog feeder adapted to allow a plurality of hogs to feed therefrom in relative peace, undisturbed and undeterred by adjacent hogs of evil and greedy propensities.

Yet another object of this invention is the provision of a hog feeder adapted to adequately space the hogs while feeding therefrom.

Still another object is to provide a hog feeder with a maximum of vision restriction during feeding therefrom.

A further object of this invention is the provision of a hog feeder that restrictively receives the head and neck of a hog, between spaced walls, during feeding therefrom.

Yet a further object of this invention is to provide a hog feeder adapted to contact the shoulders of a hog feeding therefrom.

Still a further object of this invention is the provision of a hog feeder adapted to maintain the discharge throat thereof free and clear of a build-up of feed encrustation thereon.

Other specific objects and many of the attendant advantages will be readily appreciated as the same becomes better understood by reference to the following detailed description when considered in connection with the accompanying drawings in which like reference numerals designate like parts throughout the figures thereof and wherein:

FIG. 1 is an isometric view illustrating the invention, showing one of the hopper covers partly closed and the other entirely omitted to better show construction details; and showing one of the feed trough compartment lids in closed position, and the remaining such lids in a partly open position;

FIG. 2 is a longitudinal section through the apparatus shown in FIG. 1, omitting interior structure to more clearly show chain means therein;

FIG. 3 is a cross-section of one of the feed trough compartments shown in FIG. 1, such as taken on line 3—3 of FIG. 2.

FIG. 4 is a longitudinal section of one of the feed trough compartments shown in FIG. 1, such as taken on line 4—4 of FIG. 3, showing the centrally disposed dividing wall in such feed troughs for dividing the feed zone therein; and FIG. 5 is a fragmentary plan view of the bottom of a feed trough compartment, showing a chain loosely arranged thereon, the excess chain length allowing the chain to be moved substantially to the front and rear of a feed zone, thereby to provide a maximum of chain agitation in the hopper, for controlling feed flow from the hopper.

Referring now to the drawings, wherein like reference characters designate like or corresponding parts throughout the several views, there is shown in FIG. 1 a hog feeder generally indicated at 10, comprising a pair of spaced upright feed hoppers, generally indicated at 14 and 15, with a feed trough compartment, generally indicated at 12, disposed therebetween and in communication therewith, and feed trough compartments, generally indicated at 11 and 13, at each side thereof, respectively, and in communication therewith.

For manufacture and utility, sheet metal offers many advantages in structure and use in devices of this character. Thus while I prefer to employ sheet metal of a suitable type and gauge in the fabrication of the feeders, it is to be clearly understood that such expression is not used in a limitative sense and that wood or plastic or combination of wood, plastic, and metal, or the like, may be employed in the structure without departing from the spirit of the invention.

As more particularly observed in FIGS. 1 through 4, hopper 14 comprises vertical upstanding side walls 16 and 17, and associated front and rear vertical walls 18 and 19, respectively. The open top of the hopper is provided with a removable cover 21. Said cover is provided with inturned edge portions 22 and 23 for interlocking engagement with out-turned hopper flanges such as shown at 24 and 25, respectively, see FIG. 2.

Said hopper is provided with a fabricated upwardly pitched V-bottom 26, extending from the front wall 18 to the rear wall 19, the apex or arris of said V-bottom being centrally disposed of said hopper, see FIG. 2.

The side walls 16 and 17 do not extend to the bottom 26, but terminate spaced above the bottom thereby effecting discharge openings 27 and 28 in the side walls of said hopper, respectively. The V-bottom directs feed in the hopper toward the sides of the hopper, and enables the feed to flow laterally under said side walls and through said openings into adjacent feed trough compartments, generally indicated at 11 and 12, which communicate with said hopper through said openings, respectively.

Said V-bottom comprises a portion of an opening or throat, such as at 27, through which the feed flows into said compartments.

Hopper 15, spaced from hopper 14, is substantially identical to hopper 14, and therefore hopper 15 need not be described in detail.

Hopper 15 communicates with feed trough compartments 12 and 13 through discharge openings 29 and 31 to discharge feed laterally into said feed trough compartments, respectively.

Said feed trough compartments 11, 12 and 13 are hereinafter described in detail as follows.

The space between hoppers 14 and 15 is adapted to provide the feed trough compartment 12, comprising a flanged top plate 32 connected across the adjacent sides of said hoppers 14 and 15 by means of sheet metal screws or bolts such as indicated at 33, and a flanged bottom plate 34 connected across the V-bottoms of said hoppers by means of sheet metal screws or bolts such as indicated at 35.

A low frontal wall, and a low rearward wall (not shown), such as indicated at 35, is provided across the adjacent sides of said hoppers 14 and 15 to contain feed in said compartment and to prevent feed spilling therefrom, see FIG. 1.

Feed trough compartment 11, attached to the outer side 16 of hopper 14, comprises a flanged bottom plate 36 connected to the outer edge portion of V-bottom 26 by means of sheet metal screws or bolts such as indicated at 37, a vertically disposed side plate 38 connected to the outer edge portion of said bottom plate 36 by means of sheet metal screws or bolts such as indicated at 39, and a flanged top plate 41 connected across said side plate 38 and hopper side 16 by means of sheet metal screws or bolts such as indicated at 42.

A low frontal wall 43 and a low rearward wall 44 is connected across the sides 38 and 16 to contain feed in said compartment 11 and to prevent feed spilling therefrom.

A centrally disposed dividing wall 45 is connected across sides 38 and 16, as by means of sheet metal screws 46, to divide compartment 11 into substantially two equal feed trough zones 40 and 50, and to otherwise stiffen and strengthen the structure.

Feed trough compartment 13 is constructed substantially identical to feed trough compartment 11 and therefore compartment 13 need not be described in detail.

The feed trough compartments 11, 12 and 13 are provided with paired hinged closure lids as hereinafter described.

A pair of spaced and horizontally disposed shafts 47 and 48 are journalled across sides 38 and 16 for rotation thereon.

A flat lid 49 has one end fixed to shaft 48 as by means of welding 51, and the outer end thereof is provided with a lip portion 52 protruding and extending beyond low frontal wall 43 when said lid is in its normally closed position. In its normally closed position the lid is stop-engaged on said low frontal wall 43.

A second flat lid 53, similar to lid 49, is fixed on shaft 47 as by welding 54. The outer end of said lid 49 is provided with lip 55 protruding and extending beyond low rear wall 44 when said lid is in its normally closed position. In its normally closed position the lid 53 is stop-engaged on the low rear wall 44.

Thus, paired lids 49 and 53 are pivotally actuable from a closed to an open position.

Paired similar lids, such as indicated at 56 and 57, are provided in feed trough compartments 12 and 13, respectively, and due to their similarity in structure and mounting to paired lids 49 and 53, above described, such lids 56 and 57 are not described in detail.

Lids 56 and 57, in FIG. 1, are shown disposed in a partly open position; whereas lids 49 and 53 are shown in a closed position. In their fully opened positions the lids are stop-engaged against the top plates of the feed trough compartments as indicated by the dotted line position 58 of lid 53, see FIG. 3.

Flexible means such as a flexible line, a chain 58 or the like, extending from the hoppers and into the adjacent feed trough, through said openings, are embodied in the hog feeder to provide hog operable means for breaking down any clogging or caking of feed in the hoppers, thereby assuring a discharge of feed from the hopper to the feed trough compartments. More generally, in lieu of said flexible means 58, a movable agitator means could be used, provided such movable means extended from said hopper, through said opening, and into said feed trough.

Each feed trough zone, such as zone 40, is provided with a feed clog control chain such as indicated at 58. The upper end of said chain 58 is connected to the upper side portion of hopper 14 as by means of bolt 33. Said chain hangs downwardly, crosses over to the opposite side of the hopper, is disposed through discharge opening 27, rests on bottom plate 36, and is connected to the far side of feed trough compartment 11 as by means of bolt 39. Said chain is quite loosely arranged, and slidably engages the associated V-bottom 26 and bottom plate 36 surfaces, and is generally laterally disposed of said hopper and said feed trough compartment. The looseness, or excess chain, is substantially as slack as shown in FIG. 5, so that the chain, intermediate its ends, can be moved substantially to the front and rear of the associated feed zone to provide maximum agitating effect in freeing a clogged hopper.

Zone 50 is similarly provided with chain, such as indicated at 59.

The two feed zones of feed trough compartment 12 are provided with similar chain arrangements, such as indicated at 61 and 62, respectively.

Each feed zone of feed trough compartment 12 is provided with a similar additional control chain arrangement, such as indicated at 63, said control chains leading from the opposite hopper 15 which also supplies said compartment 12. Said chain 63 is fixed at its upper end by means of bolt 64, and at its lower end by means of bolt 35.

The two feed zones of feed trough compartment 13 are provided with control chain arrangements, such as indicated at 64, similar to the control chain arrangements for the feed zones of feed trough compartment 11, said control chain being fixed at its upper end by means of bolt 33, and at its lower end by means of bolt 65.

The width of the feed trough compartments, such as between sides 38 and 16, is such as to loosely receive the head and neck of a hog therebetween. This limited opening tends to restrict the movement of a feeding hog thereby eliminating the sidewise pushing and resulting intimidation of an adjacent hog.

The vertical walls 38 and 16 additionally restricts the sidewise vision of a hog thereby minimizing the greedy propensities of a hog, thereby allowing other feeding hogs to feed in peace.

The width of the hoppers is substantially the same as the width of the feed trough compartments. Said hoppers, disposed between the feed trough compartments, provide adequate spacing means between adjacent feeding hogs, thereby further eliminating the sidewise pushing and crowding and the resulting intimidation of adjacent hogs.

*Operation.*—In operation, the hopper covers 21 are removed and the hoppers filled with grain or other feed. The V-bottom tends to direct the feed laterally outwardly through the discharge openings, such as indicated at 27, 28, 29 and 31, and into the associated feed trough compartments such as indicated at 11, 12 and 13. An approaching hog, wanting to feed, raises one of the lids, such as 53, by engaging the lip 55 with its snout, and moving forwardly, thereby providing and gaining access to the feed zone. As the hog feeds, the lid rests on the hogs neck. When the hog has finished feeding, it simply withdraws its head, and the lid automatically closes by gravitational influence.

In the event feed in the hoppers is caked or is otherwise hung-up in the hoppers clogging same, such clogging can be broken down or dislodged and the feed released from the hopper by tugging, jerking or moving the control chains, such as indicated at 58, in the compartments, backwardly or forwardly. Under normal free flowing feed conditions, as the chain in the feed zone is disturbed, during the usual feeding maneuvers, feed cascades through the discharge openings, and maintains the feed zones reasonably well supplied. In the event the feed zone is bare of feed, and feed in the hopper is restrained from flowing due to its being caked in the hopper, the aggravated feeding maneuvers by a hog will disturb the chain sufficiently to cause said chain to impinge against such caked feed in the hopper and cause such feed to be dislodged and cascade downwardly to and through the discharge openings. It has been noticed that after a period of experience with this feeder, many hogs learn that tugging at the chain results in a cascading of feed through the discharge openings, thereby controlling the flow of feed to the feed zone. Such hog action appears aggravated when the feed zone is bare of feed, and offending clogged hoppers are thusly unclogged, by the hogs themselves.

The basic unit embodied in this feeder comprises a hopper 15 and feed trough compartments, such as indicated at 11 and 13, on each side thereof. This basic unit can be extended, as shown in FIG. 2, by adding a plurality of sections, such as the section comprising hopper 14 and feed trough compartment 12. This is accomplished by removing the parts comprising section 11 from the left of hopper 15, that is parts including top 41, side 38 and bottom 36, and the lids thereof, and replacing them with hopper 14, top 32, bottom 34, and associated lids. The expansion is completed by securing said removed parts to the left of the newly added hopper 14, see FIG. 2.

A subcombination comprises a hopper and one feed trough compartment, such as hopper 15 and compartment 13.

Some characteristic features of this invention are the provision of a hog feeder having a chain extending from the hopper to the feed zone, for breaking up feed clogged in the hopper; the provision of a hog feeder having hoppers disposed between feed trough compartments, inter-alternately, for providing adequate spacing between adjacent feeding hogs; the provision of a hog feeder having a hogs head opening, for feeding, characterized by vertical sidewalls, for thusly restricting the hogs sidewise vision; the provision of a hog feeder having a hogs head opening, for feeding, characterized by being of a width to loosely receive the head and neck of a hog therebetween, for restricting the sidewise movements of a feeding hog; and a hog feeder having a chain extending from the hopper to a feed zone, and slidably engaging a V-bottom surface therebetween, comprising a throat opening whereby the sliding action of the chain on said surface maintains said throat surface clean and prevents the build-up of a feed crustation thereon.

Obviously many modifications and variations of the present invention are possible in the light of the above teachings. It is therefore to be understood, that within the scope of the appended claims, the invention may be practiced otherwise than as specifically described.

What is claimed and desired to be protected by Letters Patent of the United States is:

1. In a feeder, the combination of a hopper having an upwardly inclined bottom portion, and a horizontally disposed elongated opening in a lower side portion of said hopper, adjacent said inclined bottom portion, whereby said inclined bottom portion directs material in said hopper laterally toward said opening, and a feed trough disposed adjacent said opening to receive material discharged through said opening, with a chain having one end connected to the upper portion of a hopper wall opposite said opening, interiorly of said hopper, and the other end portion being disposed through said opening and in said feed trough, said chain slidably engaging substantially the entire length of the slope of said inclined bottom and the bottom of said feed trough, and said chain having excess length and being loosely arranged and movable forwardly and rearwardly on said inclined bottom and feed trough bottom, whereby to provide maximum agitating effect of the chain in the hopper for freeing a clogged hopper and wipe-cleaning said inclined bottom and feed trough bottom.

2. A feeder structure comprising: a hopper having an upwardly pitched V-bottom; horizontally disposed first and second elongated discharge openings in the side walls of said hopper, adjacent the inclined portions of said V-bottom, whereby said inclined portions direct material in said hopper laterally toward said openings, respectively; first and second feed trough means disposed adjacent said first and second discharge openings to receive material discharged from said openings, respectively; a first chain having one end connected to the upper portion of a hopper wall opposite the first of said openings, interiorly of said hopper, and the other end portion of said chain being disposed through said first opening and in the adjacent first feed trough means and connected to a wall of said first feed trough means opposite said first opening; and a second chain having one end connected to the upper portion of the other side wall opposite the second of said openings, interiorly of said hopper, and the other end portion of said second chain being disposed through said second opening and in the adjacent second feed trough means and connected to a wall of said second feed trough means opposite said second opening; said first and second chains slidably engaging substantially the entire length of the slopes of the adjacent inclined surfaces of said V-bottom and the bottoms of said first and second feed trough means, respectively, and said first and second chains having excess length so that the chains are loosely disposed and the intermediate portions of said chains are slidably movable forwardly and rearwardly on said slopes and trough bottoms, and whereby to provide maximum agitating effect of said chains in the hopper for controlling the flow of material from said hopper.

3. In a feeder having a hopper, a discharge opening in a side wall of said hopper, and an inclined member in said hopper sloping toward said discharge opening for guiding feed toward said discharge opening, the improvement comprising a chain having one end connected interiorly of said hopper and the other end portion disposed at said discharge opening, said chain slidably engaging substantially the entire length of the slope of said inclined bottom portion, whereby as said chain is moved laterally on said inclined member said chain wipe-cleans said inclined member.

References Cited in the file of this patent

UNITED STATES PATENTS

| 1,333,787 | Winters | Mar. 16, 1920 |
| 1,469,129 | Westerman | Sept. 25, 1923 |
| 1,881,820 | McCollough et al. | Oct. 11, 1932 |
| 2,507,264 | Otto | May 9, 1950 |

FOREIGN PATENTS

| 207,957 | Great Britain | Dec. 13, 1923 |
| 219,035 | Great Britain | July 18, 1924 |